(12) United States Patent
Danneberg et al.

(10) Patent No.: US 12,059,951 B2
(45) Date of Patent: Aug. 13, 2024

(54) ENERGY-STORE FLOOR ASSEMBLY FOR A MOTOR VEHICLE

(71) Applicant: Bayerische Motoren Werke Aktiengesellschaft, Munich (DE)

(72) Inventors: Jan Danneberg, Munich (DE); Ronny Grosse, Eichenau (DE); Juergen Leschhorn, Geltendorf (DE); Andreas Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 335 days.

(21) Appl. No.: 17/635,114

(22) PCT Filed: Sep. 4, 2020

(86) PCT No.: PCT/EP2020/074771
§ 371 (c)(1),
(2) Date: Feb. 14, 2022

(87) PCT Pub. No.: WO2021/043984
PCT Pub. Date: Mar. 11, 2021

(65) Prior Publication Data
US 2022/0297523 A1 Sep. 22, 2022

(30) Foreign Application Priority Data

Sep. 5, 2019 (DE) ..................... 10 2019 123 846.3

(51) Int. Cl.
*B60K 1/04* (2019.01)
*B62D 25/20* (2006.01)
(Continued)

(52) U.S. Cl.
CPC ............... *B60K 1/04* (2013.01); *B62D 25/20* (2013.01); *H01M 50/249* (2021.01);
(Continued)

(58) Field of Classification Search
CPC .............. B60K 1/04; B60K 2001/0438; B62D 25/20; H01M 50/249; H01M 2220/20
See application file for complete search history.

(56) References Cited

U.S. PATENT DOCUMENTS 5,636,890 A 6/1997 Cooper
9,227,582 B2 * 1/2016 Katayama ............. H01M 50/24
(Continued)

FOREIGN PATENT DOCUMENTS

CN 106660439 A 5/2017
CN 114206711 A 3/2022
(Continued)

OTHER PUBLICATIONS

English translation of Chinese-language Office Action issued in Chinese Application No. 202080057815.7 dated Dec. 11, 2023 (6 pages).
(Continued)

*Primary Examiner* — Jason D Shanske
*Assistant Examiner* — James J Triggs
(74) *Attorney, Agent, or Firm* — Crowell & Moring LLP (57) ABSTRACT

An energy-store floor assembly for a motor vehicle includes an electrical energy-store device which has a plurality of battery modules and is accommodated in a multi-part store housing and arranged on the bottom side of a vehicle floor of the motor vehicle. In order that the store housing can be adapted to the shape of the motor vehicle body and/or to components of the energy-store device in an improved way, housing parts of the store housing are interconnected by at least one gas-tight connection, which has an uneven course with respect to the vehicle vertical direction in at least one length region.

9 Claims, 5 Drawing Sheets

(51) Int. Cl.
*H01M 50/249* (2021.01)
*H01M 50/258* (2021.01)

(52) U.S. Cl.
CPC ............... *H01M 50/258* (2021.01); *B60K 2001/0438* (2013.01); *H01M 2220/20* (2013.01)

(56) References Cited

U.S. PATENT DOCUMENTS

| | | | |
|---|---|---|---|
| 2010/0307848 A1* | 12/2010 | Hashimoto | B60K 1/04 180/68.5 |
| 2013/0181486 A1 | 7/2013 | Tabuteau et al. | |
| 2014/0338999 A1 | 11/2014 | Fujii et al. | |
| 2016/0355100 A1 | 12/2016 | Ito et al. | |
| 2017/0203668 A1 | 7/2017 | Enning et al. | |
| 2018/0361874 A1 | 12/2018 | Kobayashi et al. | |
| 2018/0370570 A1 | 12/2018 | Ayukawa | |
| 2019/0337575 A1 | 11/2019 | Kellner et al. | |
| 2022/0250459 A1 | 8/2022 | Danneberg et al. | |

FOREIGN PATENT DOCUMENTS

| | | |
|---|---|---|
| DE | 10 2010 022 876 A1 | 1/2011 |
| DE | 10 2012 203 892 A1 | 9/2013 |
| DE | 10 2013 016 549 A1 | 4/2015 |
| DE | 10 2018 115 211 A1 | 12/2018 |
| DE | 10 2018 110 481 B3 | 3/2019 |
| EP | 2 468 609 A2 | 6/2012 |
| JP | 2012-56395 A | 3/2012 |
| JP | 2012056395 A * | 3/2021 |
| WO | WO 2011/007501 A1 | 1/2011 |

OTHER PUBLICATIONS

International Search Report (PCT/ISA/210) issued in PCT Application No. PCT/EP2020/074771 dated Nov. 2, 2020 with English translation (five (5) pages).

German-language Written Opinion (PCT/ISA/237) issued in PCT Application No. PCT/EP2020/074771 dated Nov. 2, 2020 (six (6) pages).

German-language Search Report issued in German Application No. 10 2019 123 846.3 dated Aug. 17, 2020 with partial English translation (10 pages).

* cited by examiner

ENERGY-STORE FLOOR ASSEMBLY FOR A MOTOR VEHICLE

BACKGROUND AND SUMMARY OF THE INVENTION

The invention relates to an energy storage floor assembly for a motor vehicle.

An energy storage floor assembly of this kind is already known from EP 2 468 609 A2, in which a vehicle floor of the floor assembly is laterally delimited by side sills in each case and is stiffened by longitudinal members and/or cross-members. A plurality of battery modules of an electrical energy storage device, which is used to supply electrical energy to an electrical drive system of the motor vehicle, is received in this case in a storage housing which comprises an upper shell and a lower shell. The two shells in this case are connected to one another via a flange connection which extends circumferentially in a plane. In the region of this flange connection, the storage housing is fastened on the underside of the vehicle floor by means of a plurality of screw connections in each case, in the region of the side sills and the cross-members. The storage housing is therefore configured as a separate unit from the motor-vehicle body shell and must necessarily have an at least substantially flat flange connection profile, since the side sills and the cross-members, to which the storage housing is attached on the body shell side, have a flat profile. In addition, the storage housing has to satisfy lesser requirements in terms of static and dynamic properties, and also in terms of crash properties, due to the separate embodiment and subsequent attachment to the motor vehicle body shell. The vehicle floor does not therefore have any further function according to the prior art.

The problem addressed by the present invention is that of creating an energy storage floor assembly of a motor vehicle, by means of which the storage housing can be adapted to the shape of the motor vehicle body and/or to components of the energy storage device in an improved manner.

This problem is solved according to the invention by an energy storage floor assembly for a motor vehicle having the features of the independent claim. Advantageous embodiments with favorable developments are the subject matter of the dependent claims.

The energy storage floor assembly according to the invention comprises a storage housing, in which an electrical energy storage device comprising a plurality of battery modules is received. So that the storage housing can be adapted in an improved manner to the shape of the motor vehicle body and/or to components of the energy storage device, according to the invention respective housing parts of the storage housing are connected to one another by at least one gastight connection, which has an uneven course (profile) in at least one longitudinal region relative to the vertical vehicle direction. Unlike the previously known storage housings, in which the housing parts are connected via a flat flange connection or a flange connection lying in a plane, a three-dimensional flange profile is therefore provided, in which the gastight connection lies outside a main connection plane between the two housing parts, at least in one longitudinal region.

The advantage of a three-dimensional profile of this kind of the gastight connection between the housing parts is that, on the one hand, the storage housing can be more effectively adapted to features such as the shape/contour of the motor vehicle body shell, for example, and/or, on the other hand, the storage housing can be configured in such a manner that components of the energy storage device can be housed in the storage housing in a particularly favorable manner. Hence, for example, connection terminals for connecting the energy storage device to components of the electrical drivetrain, or other device, located outside the storage housing can be accommodated in a particularly favorable manner, for example, in the front or rear region of the storage housing.

In a preferred embodiment, it is thereby provided that the vehicle floor is designed as a housing part of the storage housing and is connected to at least one housing part of the storage housing which is on the outside of the body shell. The use of the vehicle floor, on the one hand, as part of the motor vehicle body or as part of the body shell and, on the other hand, as a housing part of the storage housing, has in this case the advantage of dual use, which leads to a substantial saving in terms of installation space, weight and production cost. Moreover, the energy storage device is therefore received in a storage housing which is integrated in the vehicle body or in the body shell, so that the energy storage device is integrated in relation to the crash requirements, for example, particularly favorably on the vehicle body side or the body shell side.

So that the vehicle floor can perform its function for the body shell, on the one hand, and can be designed as the housing part of the storage housing, on the other, it is even more important for the gastight connection between the vehicle floor and the other housing part to lie outside the main connection plane between the two housing parts, at least in one longitudinal region. In this way, the vehicle floor can, on the one hand, have a particularly stiff realization and, on the other hand, the storage housing can be designed particularly effectively to receive respective components of the energy storage device.

Furthermore, it has proved advantageous for the gastight connection between the vehicle floor and the at least one other housing part to run in a main connection plane in a central region of the energy storage floor group, and for the at least one longitudinal region of the gastight connection lying outside the main connection plane to run in a rear and/or a front end region of the energy storage floor assembly. Particularly in the rear and/or front end region of the energy storage floor assembly, corresponding embodiments of the vehicle floor result, since it merges into the rear vehicle region at the rear, for example, and into the front end wall at the front. In addition, the connection terminals of the energy storage device are customarily also provided in the rear and/or front end region of the energy storage floor assembly, so that there is a greater space requirement within the storage housing in this region.

A further advantageous embodiment of the invention envisages that the main connection plane extends at least substantially horizontally. In this way, a geometrically, but very simply configured, storage housing can be produced.

In addition, it has proved advantageous for the longitudinal region of the gastight connection lying outside the main connection plane to extend upwards, at least substantially in the vertical vehicle direction, in the rear and/or in the front end region of the energy storage floor assembly, starting from the main connection plane. This results in a particularly favorable embodiment of the vehicle floor and of the storage housing.

In a further embodiment of the invention, it is provided that the longitudinal region of the gastight connection, which has an uneven course relative to the vertical vehicle direction, delimits a receiving space region of the storage housing, which has a larger cross section in relation to a further receiving space region of the storage housing. As a result of the three-dimensional profile of the gastight connection, it is therefore easily possible for the storage housing to have a larger sectional configuration, and to be able to house components of the energy storage device in a particularly favorable manner.

Moreover, a variant of the invention in which the gastight connection of the other housing part, and of the vehicle floor, comprises a plurality of mechanical connection elements has proved advantageous, the connection elements being arranged on the outside of a seal running in the region of the gastight connection. Mechanical connection elements of this kind, such as screw elements or the like, mean that the at least two housing parts—the vehicle floor and the floor element—can be pressed against one another in a particularly effective manner, so that a seal for producing the gastight connection is connected to the respective housing parts in a particularly secure manner.

Furthermore, it has proved advantageous for the further housing part to be configured as a floor element which is on the outside of the body shell. A floor element of this kind, which is on the outside of the body shell, can be produced particularly effectively and can assume corresponding functions in relation to protection of the energy storage device arranged above the floor element, for example. Hence, the floor element can be created from a corresponding material or in a corresponding design, for example, so that as so-called bollard protection when the underfloor or the floor element rests on a stone, a bollard, a curbstone, or the like, it exhibits sufficient rigidity and stability against indentation, or the like, so that damage to the energy storage device is thereby avoided.

Finally, it has proved advantageous for the vehicle floor to have a one-part or two-part design, and for the other housing part to have a one-part design. It is generally advantageous for the smallest possible number of housing parts to create the storage housing, since a reliable, simple and cost-effective seal of the storage housing can thereby be created. By reducing this number of parts, the cost involved in sealing the vehicle floor itself, and also in relation to the at least one other housing part of the storage housing, can be minimized. Or, in other words, by avoiding points of separation between the housing parts of the storage housing, potentially leaky points are avoided.

As a result, the use of the vehicle floor as part of the motor vehicle body or of the body shell, on the one hand, and as a housing part of the storage housing, on the other, means that a dual use is achieved which is beneficial in terms of weight and cost, and a simplified connection and seal of the storage housing is achieved due to the integral design of the main floor.

Further features of the invention result from the claims, the figures and the description of the figures. The features and combinations of features referred to above in the description, and also the features and combinations of features referred to below and/or features and combinations of features only shown in the figures can be used not only in the combination specified in each case, but also in other combinations, or in isolation.

The invention is explained in greater detail with the help of a preferred exemplary embodiment, and also with reference to the drawings.

DETAILED DESCRIPTION OF THE DRAWINGS

Figure 1:
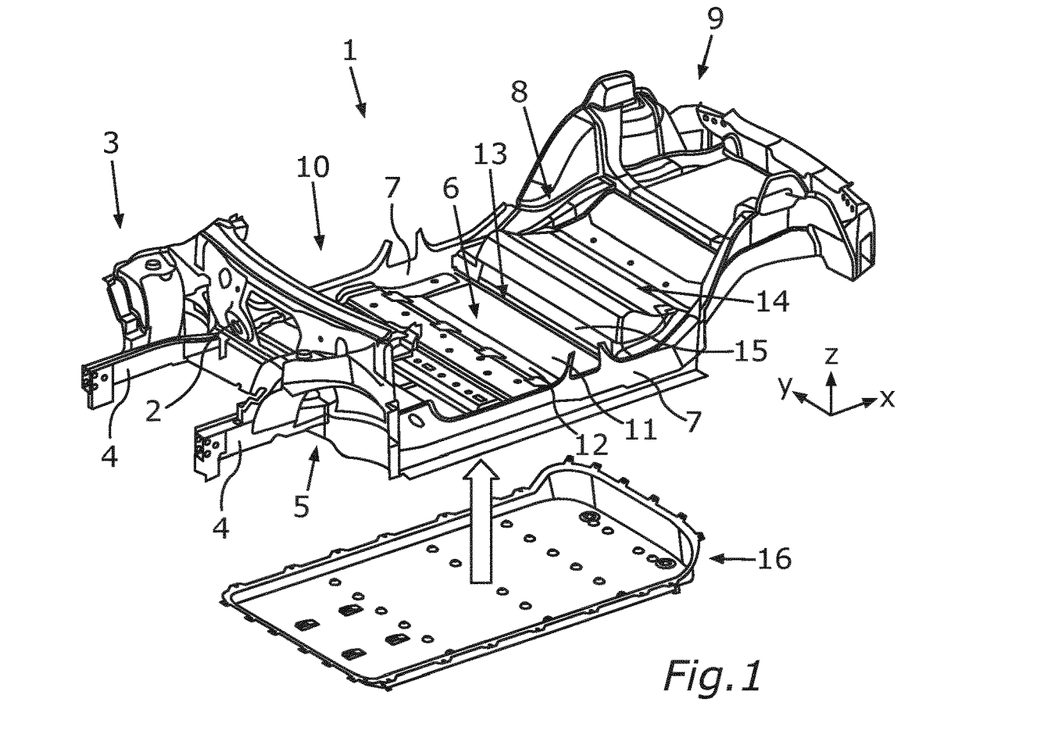
FIG. 1 is an exploded view of an energy storage floor assembly for a motor vehicle, having a vehicle floor of a motor vehicle body according to an embodiment of the invention on the body shell side, which vehicle floor forms a housing part of a storage housing, to which a floor element can be fitted as a further housing part of the storage housing according to the arrow shown, as a result of which a gastight storage housing for receiving an electrical energy storage device comprising multiple battery modules is created.
Figure 2:
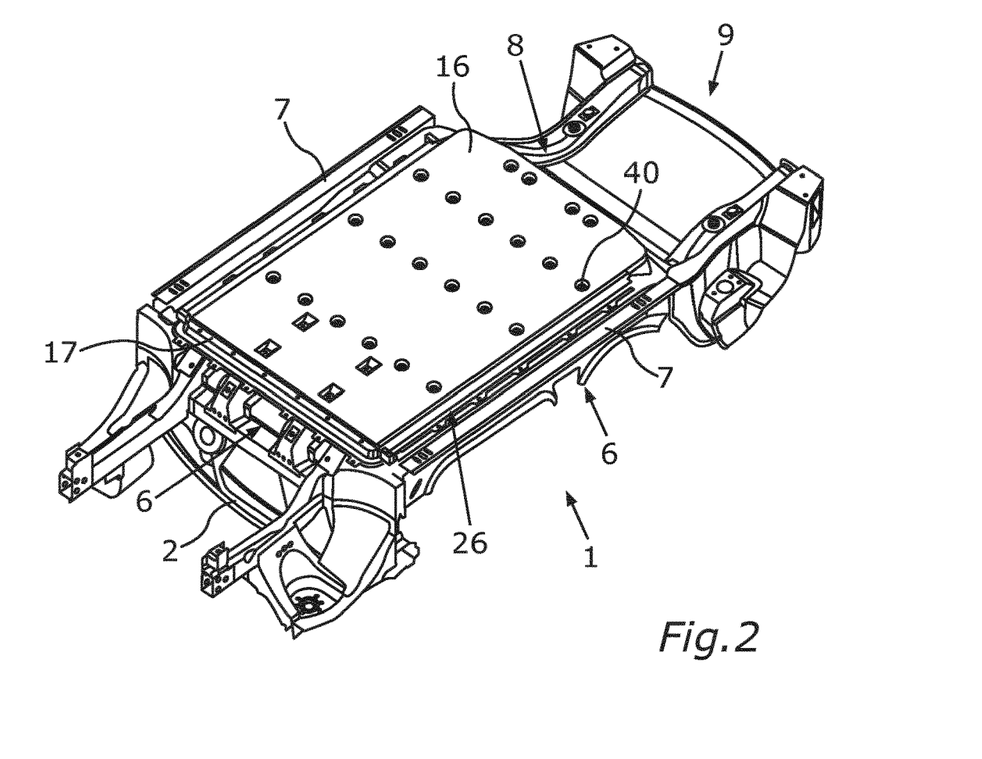
FIG. 2 is a perspective bottom view of the energy storage floor assembly with the storage housing formed by the vehicle floor on the body shell side and the floor element on the outside of the body shell, according to the embodiment in FIG. 1, which are connected via at least one gastight connection which has an uneven course (profile) in at least one longitudinal region relative to the vertical vehicle direction.

FIGS. 1 and 2 show, as a perspective exploded view and a perspective bottom view, respectively, a motor vehicle body 1 for an electrically operable motor vehicle. This motor vehicle may, for example, be one with a fully electric drive (BEV) or it may be a hybrid vehicle (PHEV), which also has a combustion engine in addition to a purely electric drive. The motor vehicle body 1 in the present case normally comprises a front end wall 2 of a passenger compartment, to which a front structure 3 is attached in a forwards direction, said structure comprising, for example, longitudinal members/engine mounts 4 of a center longitudinal member plane in each case. In the backwards direction, the front wall 2 merges in a transitional region 5, which comprises an obliquely running pedal floor or the like, for example, with a vehicle floor 6 which delimits the passenger compartment in a downwards direction and extends as far as side sills 7 running horizontally on the outside in the longitudinal vehicle direction. In the backwards direction, the vehicle floor 6 extends up to a transitional region 8, in which the vehicle floor 6 merges with a rear vehicle structure 9.

Figure 3:
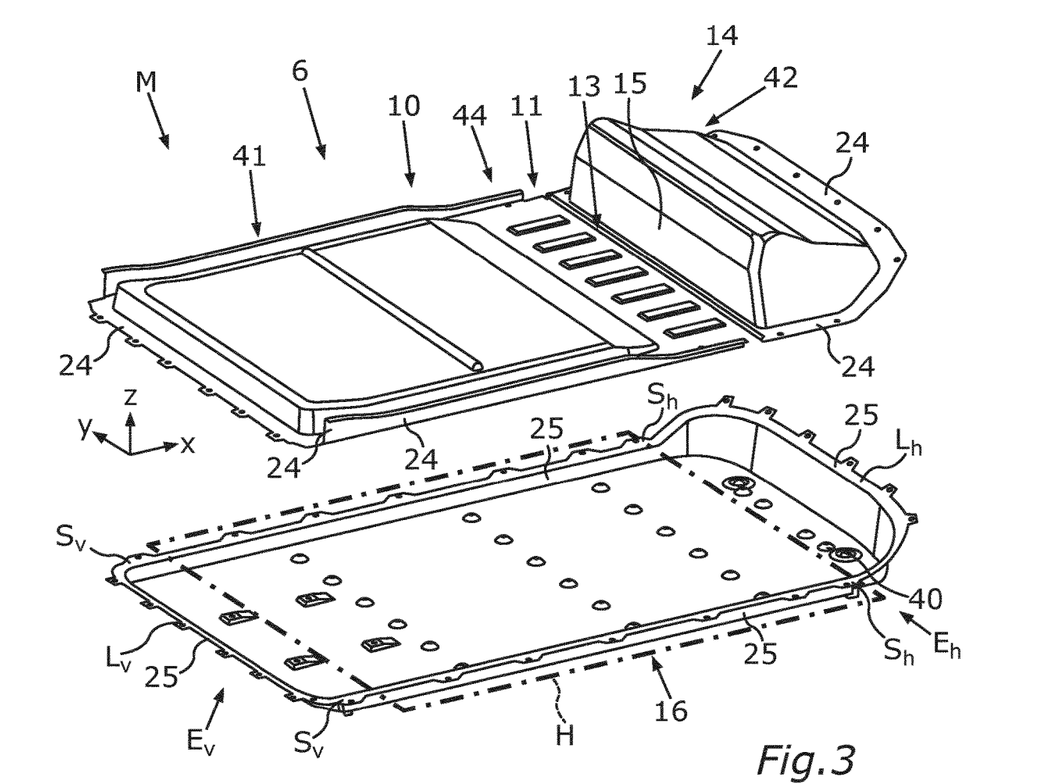
FIG. 3 shows respective perspective views of the vehicle floor depicted here in two parts, separately from the motor vehicle body, having a main floor and a rear floor, and also of the other housing part designed as a floor element on the outside of the body shell, which creates the storage housing along with the main floor and the rear floor, wherein the vehicle floor with the main floor and the rear floor, on the one hand, and the floor element, on the other, are connected to one another on the circumferential side by a gastight connection.

The vehicle floor 6 is shown as a perspective depiction in FIG. 3 separate from the motor vehicle body 1. In this case, it can be seen initially that the vehicle floor 6 comprises an integral main floor 10 which extends in the longitudinal vehicle direction in a forwards direction at least up to the transitional region 5 with the front end wall 2, and in a backwards direction at least up to a floor region 11 below and behind a front row of vehicle seats. The position of this front row of vehicle seats can be recognized in this case by respective seat cross-members 12 in FIG. 1, on which the row of vehicle seats of the front row of vehicle seats in each case rests.

The integral main floor 10 of the vehicle floor 6 is connected to a rear floor 14 via a gastight flange connection 13 running in the transverse vehicle direction, which rear floor extends beneath a rear row of vehicle seats, for example, and a so-called heel wall or a heel element 15, which is arranged beneath a rear row of vehicle seats. The gastight connection 13 between the main floor 10 and the rear floor 14 may be formed by a joining connection and/or a mechanical connection and, in addition, by at least one sealing element, in a manner described in greater detail below. Both the main floor 10 and the rear floor 14 extend over the at least substantially entire vehicle width, so that the vehicle floor 6 only comprises two structural members overall, namely the main floor 10 and the rear floor 14. The gastight flange connection 13 in the present case extends in an at least substantially planar and horizontal manner in the transverse vehicle direction.

In the present exemplary embodiment, main floors and rear floors 10, 14 are each formed from body sheet. Equally, components made of fiber-reinforced plastic, in particular, would also be conceivable. An integral embodiment of the vehicle floor 6 would likewise be conceivable.

Beneath the vehicle floor 6, the energy storage floor assembly comprises a further housing part in the form of a floor plate or a floor element 16, which—as can be seen from FIGS. 1 to 4, in particular—is integrally formed.

Figure 4:
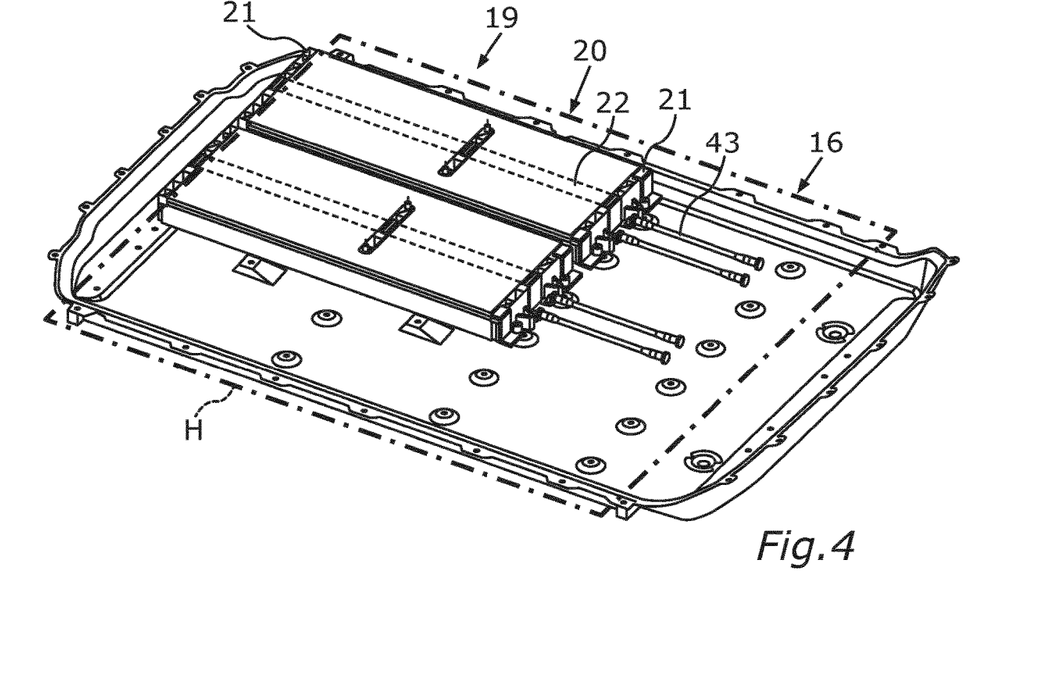
FIG. 4 is a perspective view of the floor element on which a plurality of battery modules of the energy storage device are arranged on the upper side.

Particularly in the overview shown in FIGS. 1 to 3, it can be seen in this case that the floor element 16 and the vehicle floor 6 each form housing parts of a storage housing 17, which is designed to receive an electrical energy storage device 19 comprising a plurality of battery modules 18 in each case, which can be seen in FIG. 4. These battery modules 18 are combined to form a battery pack 20 in each case, wherein respective support elements in the form of pressure plates 21 are provided, these being connected to one another by corresponding tensioning elements 22 and interlocking the individual battery modules 18 with one another. In FIG. 4, two of these battery packs 20 are depicted with a perspective view of the floor element 16, in their arrangement provided on the upper side of the floor element 16.

It is therefore clear overall that the two-part vehicle floor 6 and the floor element 16 represent the housing parts which form the storage housing 17 for the energy storage device 19. It is therefore necessary, among other things, for these two housing parts—the vehicle floor 6 on the body shell side and the floor element 16 on the outside of the body shell—to have to be connected to one another via a gastight connection 26 extending on the circumferential side, which connection can be seen in FIG. 5 in a detail and perspective side view of the energy storage floor assembly.

Figure 7:
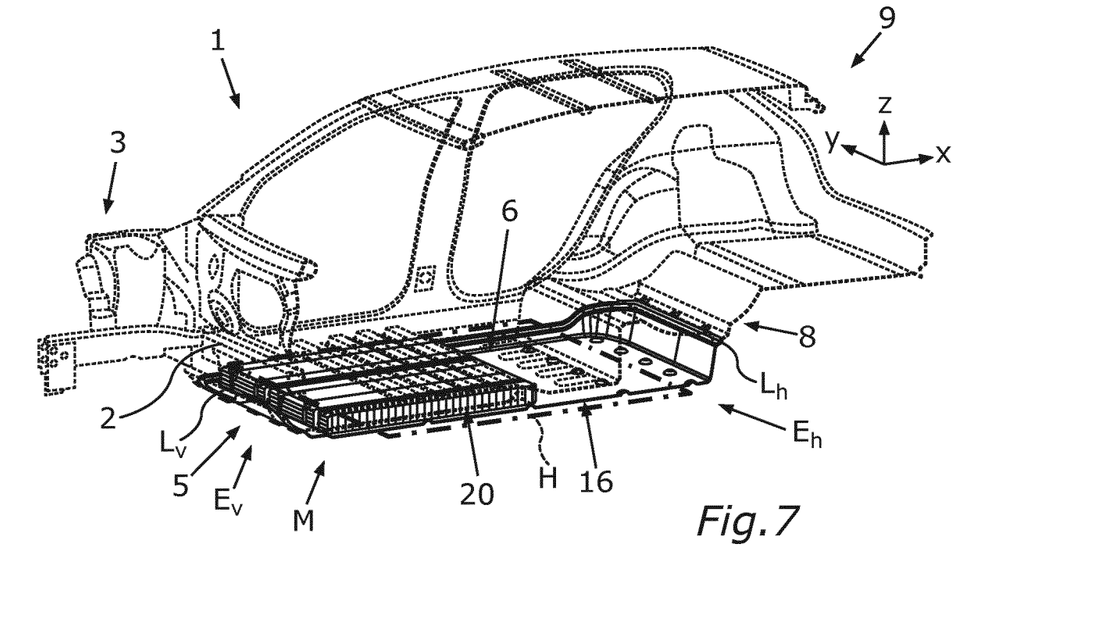
FIG. 7 is a perspective sectional view through the motor vehicle body with the energy storage floor assembly described with the help of FIGS. 1 to 6.
Figure 8:
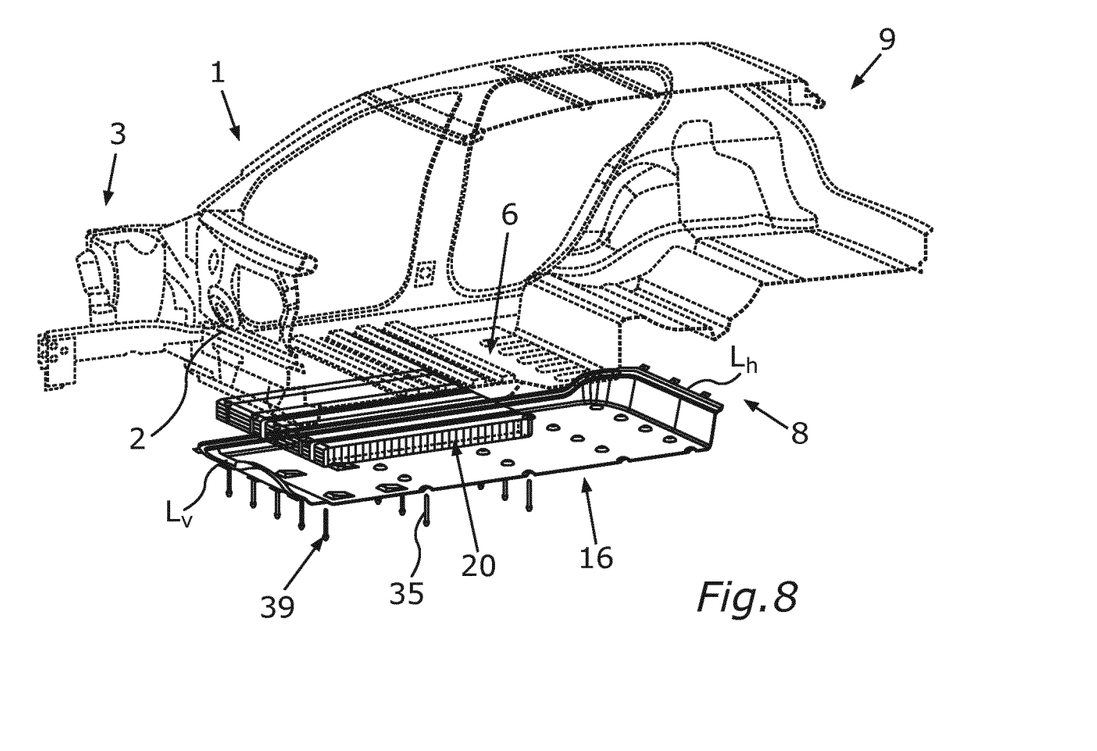
FIG. 8 is a perspective exploded view of the motor vehicle body with the energy storage floor assembly according to FIG. 7.

As is clear particularly from FIG. 3 and from FIGS. 7 and 8, which each show a perspective sectional view through the motor vehicle body with the energy storage floor assembly described with the help of FIGS. 1 to 4, the gastight connection 13 has an uneven profile between the vehicle floor 6 and the floor element 16 in at least one longitudinal (length) region $L_v$ and $L_h$ in relation to the vertical vehicle direction (z direction). To be more precise, the gastight connection 13 runs in a center region M of the energy storage floor assembly in a main connection plane H of the vehicle floor 6 with the floor element 16 which, moreover, extends at least substantially horizontally in this case. In addition, the gastight connection 13 runs in at least one—and in the present case in the two—longitudinal regions $L_v$ and $L_h$ outside the main connection plane H of the vehicle floor 6 with the floor element 16. The front longitudinal region $L_v$ of the gastight connection 13 in this case extends in a front end region $E_v$ and the rear longitudinal region $L_h$ of the gastight connection 13 in a rear end region $E_h$ of the energy storage floor assembly or the storage housing 17, which is formed by the vehicle floor 6 and the floor element 16. The front longitudinal region $L_v$ of the gastight connection 13 rises in an upwards direction in this case—as can be seen from FIG. 4, in particular—starting from the respective side points $S_v$ of the gastight connection 13, from where the gastight connection 13 in the front region of the storage housing 17 extends horizontally in the transverse vehicle direction. The rear longitudinal region $L_v$ of the gastight connection 13 rises in an upwards direction—as can be seen from FIG. 3, in particular—starting from respective side points $S_h$ in the region of the rear floor 14 of the gastight connection 13, wherein the gastight connection 13 extends horizontally at the back, likewise in the transverse vehicle direction.

As a result of the three-dimensional profile of the gastight connection 13 in the front longitudinal region $L_v$, a very favorable attachment of the storage housing 17 to the front end wall 2, drawn forwards in an upwards direction in the vertical vehicle direction (z direction), is achieved, as can be seen from FIG. 2 and FIGS. 7 and 8, in particular.

As a result of the three-dimensional profile of the gastight connection 13 in the rear longitudinal region $L_h$, likewise on the one hand, a very favorable attachment of the storage housing 17 to the transitional region 8, drawn backwards in an upwards direction in the vertical vehicle direction (z direction), is achieved, in which the vehicle floor 6 and the floor element 16 merge with the rear vehicle structure 9. On the other hand, as a result of the three-dimensional profile of the gastight connection 13 in the rear longitudinal region $L_h$, a receiving region or receiving space 42 of the storage housing 17 is delimited, which has, in relation to a further receiving space region 44 of the storage housing 17 arranged in front of it, a cross section enlarged in the vertical vehicle direction (z direction) or a greater extent. In this way, components of the energy storage device 19 can be housed particularly favorably in the storage housing 17. Hence, in the present case, a connection terminal not shown here for connecting the energy storage device 19 to components of the electrical drivetrain, or another device, lying outside the storage housing 17, is provided in the receiving space 42.

In the overview provided in FIGS. 3 and 4, it is clear that the battery packs 20 with the battery modules 18 are arranged in the front portion of the storage housing 17. For this purpose, the main floor 10 has a box-shaped elevation 41 in its front portion, which extends over roughly three-quarters of its length in the longitudinal vehicle direction. The rear floor 14 of the vehicle floor 6 comprises the receiving space 42 already described, namely starting from the heel wall 15 in a backwards direction. In this region, for example, connections or power electronics and also additional components, such as protective switches or the like, can also be provided. In the receiving space region 44 between the two elevations or receiving space regions 41, 42, which is arranged at the level of the floor region 11, lines 43 which can only be seen in FIG. 4 run within the storage housing, so that the storage housing 17 has a smaller cross section in this region.

Figure 5:
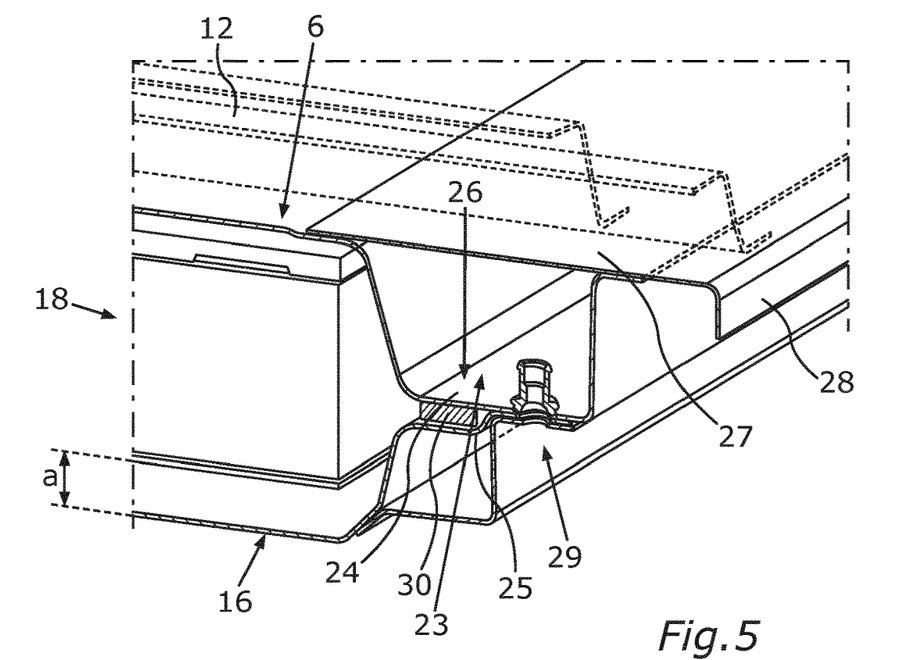
FIG. 5 is a detail and perspective sectional view of the gastight connection of the vehicle floor as the one housing part, and of the floor element as the other housing part of the storage housing.

Over most of the front longitudinal region of the main floor 10, the vehicle floor 6 has a bead 23 which can clearly be seen in FIG. 5 and which is substantially U-shaped in cross section, and through which a respective carrier element is formed which reinforces the vehicle floor 6, particularly in the longitudinal vehicle direction and, moreover, provides a connecting region or flange 24 of the vehicle floor 6 which, together with a flange 25 on the side of the floor element 16, produces the gastight connection 26. The carrier element or the bead 23 in this case is closed on the upper side by a closing element, for example a closing plate 27, for reinforcement purposes. In the transverse vehicle direction, or laterally beyond the carrier element 23, the vehicle floor 5 extends in the region of the main floor 10 as far as a flange 28, with which the vehicle floor 6 is connected to the laterally assigned side sill 7. Consequently, it can be seen that the respective carrier element 23, which also forms the flange 24 for the gastight connection 26 to the floor element 16, is arranged at a lateral distance or in the transverse vehicle direction spaced apart from the side sill 7 in each case. Consequently, the storage housing 17 therefore ends at a lateral distance on the inside of the respective side sill 7. This has particularly favorable advantages in the event of a side impact, for example.

Furthermore, the vehicle floor 6 is reinforced on the upper side, not only by the seat cross-members 12, but additional, special cross-members are provided in order to increase the rigidity of the energy storage floor assembly. As a result of this, it is possible for the storage housing 17 to get by without substantial stiffening elements or for the entire energy store, with the storage housing 17 and the energy storage device 19, to be configured as an integral component of the motor vehicle body 1 or of the body shell.

It can once again be seen from FIG. 2, in particular, that the floor element 16, and therefore the entire storage housing 17, ends at a lateral distance from the respective side sill 7. In a forwards direction, the floor element 16 extends as far as the transitional region 5 between the vehicle floor 6 and the front wall 2. In this region, the gastight connection 26 between the floor element 16 and the vehicle floor 6 also runs in a circumferential manner. In a backwards direction, the floor element 16, or the rear floor 14 of the vehicle floor 6, extends into the transitional region 8 to the rear vehicle structure 9. The gastight connection 26 is provided in this region too, said gastight connection therefore being formed in a substantially rectangular manner circulating about the two housing parts—the vehicle floor 6 and the floor element 16.

It can be seen from FIG. 5, in particular, that the gastight connection 6 or the flange connection comprises a plurality of mechanical connection elements, in the form of screw connection elements 29 in the present case, which—0 relative to the sealing direction—are arranged on the outside of a seal 30 running in the region of the flange connection between the flanges 24 and 25. In other words, the sealing of the storage housing 17 takes place by means of the seal 30, preferably on the inside of the mechanical connection elements 29 in each case, so that they themselves do not have to be sealed, but only the two flanges 24, 25 in respect of one another. The screw connection elements 29 in this case ensure not only a pressing of the respective flanges 24, 25, but also of the seal 30, where appropriate. This seal 30 may be, for example, an insertion seal (in particular a flat seal or a profile seal), a dispersion seal (adhesive on one side or adhesive on both sides) or a glued-on seal. Conventional solutions in this case are known to the person skilled in the art.

In the present case, the vehicle floor 6 is formed with the main floor 10 and the rear floor 14 as part of the painted motor vehicle body shell, and is therefore produced jointly with the motor vehicle body 1 in a body shell assembly. After this, the motor vehicle body 1, and therefore also the vehicle floor 6, are provided with corresponding coats of paint during cathodic immersion painting, and possibly also with corresponding coats of paint in a further painting stage. The assembly of the energy storage device 19 and the floor element 16, or else the creation of the entire energy store and the storage housing 17, consequently takes place in a subsequent assembly stage outside the body shell.

Figure 6:
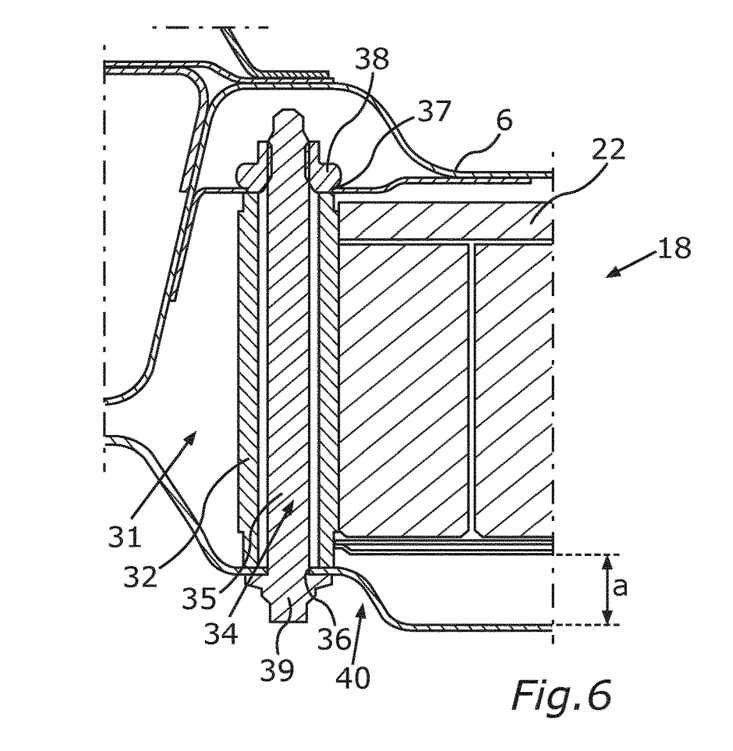
FIG. 6 is a detail sectional view through the storage housing in the region of a mechanical connection element between the vehicle floor and the floor element.

The fastening of the respective battery packs 20, or battery modules 18, can clearly be seen from FIG. 6. For this purpose, a plurality of mechanical connection elements 31 is provided in each case, by means of which the other housing part, in the form of the floor element 16 and the vehicle floor 6, are connected to one another in a center region of the storage housing 17. The mechanical connection elements 31 in this case essentially have two functions and advantages: on the one hand, the battery modules 18 or battery packs 20 in each case are arranged directly with the vehicle floor 6 in a quasi-suspended arrangement or between the vehicle floor 6 and the floor element 16 and, on the other hand, the floor element 16 itself is also connected to the vehicle floor 6 in a rigid and stable manner via the mechanical connection elements 31 in a center region. Each of the mechanical connection elements 31 comprises a support element 32 in this case, which is configured as a respective pressure plate 21 of the respective battery pack 20 in the present case—as can be seen from FIG. 4. This respective support element or the respective pressure plate 32 is penetrated by a through-opening 33 for a screw element 34, wherein the screw element 34 not only penetrates the respective pressure plate 21 of the corresponding battery module 18 or battery pack 20, but also the respective housing parts of the storage housing 17, namely the floor element 16 and the vehicle floor 6. In this case, respective screws 35 are inserted through the respective openings 36 in the floor element 16 and via the through-opening 33 into the respective pressure plate 21, and are fed out of the vehicle floor 6 again through a respective opening 37 on the upper side, and locked using a screw nut 38. By tightening the respective screw elements 34, on the one hand, the floor element 16—with the interposition of the respective pressure plate 21—is tensioned against the vehicle floor 6 and, on the other hand, the respective battery pack 20 is fastened with the plurality of battery modules 18 on the underside of the vehicle floor 6.

Between a screw head 39 of the respective screw 35 and the floor element 16, on the one hand, and the respective screw nut 38 and the vehicle floor 6, on the other, a gastight seal which is not further visible here is provided, so that each of the mechanical connection elements 31 overall is likewise configured in a gastight manner, so that in an emergency situation or in case of an accident, for example, gas produced by the energy storage device cannot thereby reach the outside or the inside of the vehicle.

Figure 9:
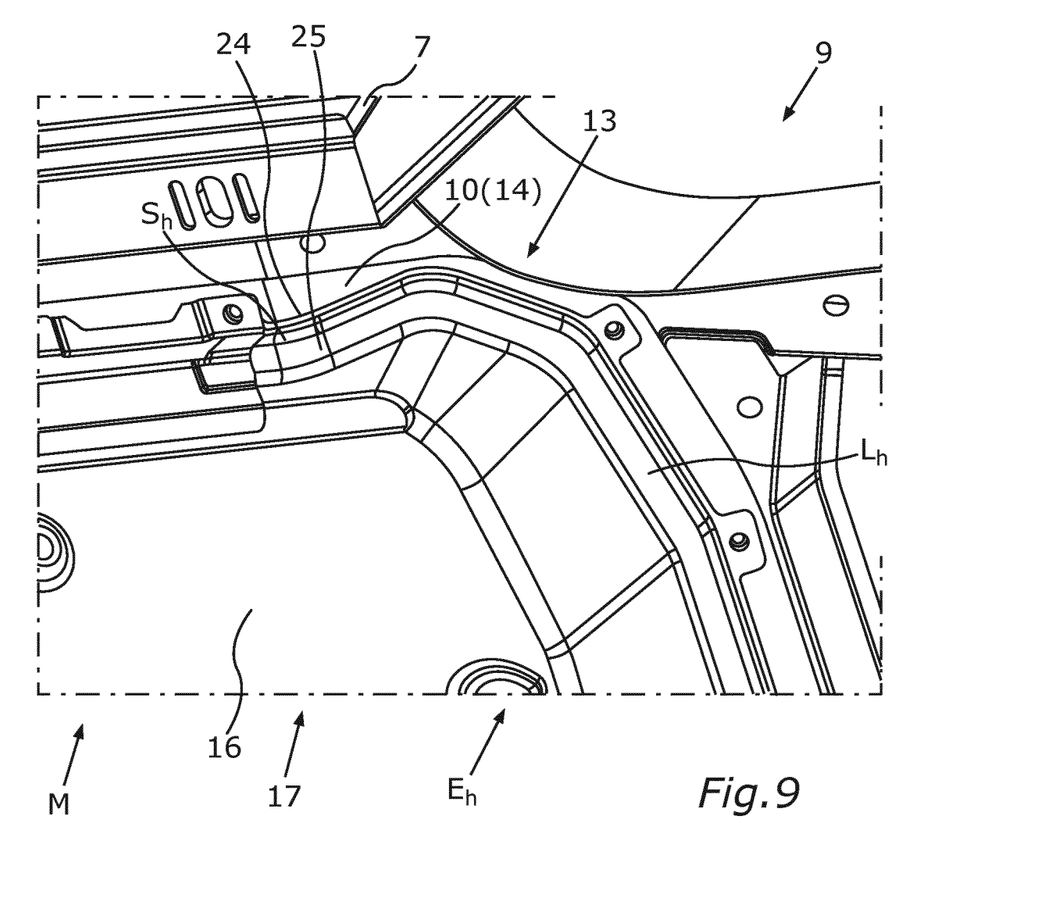
FIG. 9 is a perspective and sectional bottom view of the rear end region of the energy storage floor assembly according to FIG. 7.

Finally, FIG. 9 once again shows the rear end region Eh of the energy storage floor assembly according to FIG. 7 as a perspective, detail bottom view. Once again, this makes it clear that the gastight connection 17 between the vehicle floor 6, in the present case the main floor 10 and the floor element 16, rises in an upwards direction starting from the side points $S_h$ of the gastight connection 13 in each case, wherein the gastight connection 13 extends horizontally at the rear likewise in the transverse vehicle direction.

The present storage housing 17 in this case is described as an integral part of the body shell or the body 1 of the motor vehicle, since the vehicle floor 6 assumes functions both of the body shell 1 and also of the storage housing. The present invention, in particular the profile of gastight connection, may also be used, however, in a conventional storage housing, in which the upper part thereof is not configured as a vehicle floor on the body shell side, but instead as a structural element which is not part of the body shell and which is arranged beneath a conventional vehicle floor, since the advantages of a three-dimensional profile of the gastight connection—for example the increase in space in the storage housing in the front and/or rear end region, or the adaptability thereof to features of the body shell—come into play with a storage housing designed in this way too.

LIST OF REFERENCE SIGNS 1 motor vehicle body
2 front wall
3 front structure
4 longitudinal member
5 transitional region
6 vehicle floor
7 side sill
8 transitional region
9 rear vehicle structure
10 main floor
11 floor region
12 seat cross-member
13 gastight connection
14 rear floor
15 heel wall
16 floor element/floor plate
17 storage housing
18 battery module
19 energy storage device
20 battery pack
21 pressure plate
22 tensioning elements
23 bead/support element
24 flange
25 flange
26 gastight connection
27 closing plate
28 flange
29 connection elements
30 seal
31 connection elements
32 pressure plate
33 through-opening
34 screw element
35 screw
36 opening
37 opening
38 screw nut
39 screw head
40 beads
41 elevation
42 elevation
43 lines
44 receiving space region
Lv longitudinal (length) region, front
Lh longitudinal (length) region, rear
M center region
H main connecting plane
Ev front end region
Eh rear end region
Sv side point, front
Sh side point, rear

What is claimed is:

1. An energy storage floor assembly for a motor vehicle having an electrical energy storage device with a plurality of battery modules, comprising:
a multi-part storage housing configured to accommodate the storage device, the storage device being arranged on an underside of a vehicle floor of the motor vehicle, wherein
respective housing parts of the multi-part storage housing are connected by at least one gastight connection which has an uneven course in at least one longitudinal region relative to a vertical vehicle direction.

2. The energy storage floor assembly according to claim 1, wherein
the vehicle floor is configured as a housing part of the multi-part storage housing and is connected to at least one other housing part of the storage housing by way of the gastight connection, the other housing part being outside of a body shell of the motor vehicle.

3. The energy storage floor assembly according to claim 2, wherein
the gastight connection between the vehicle floor and the at least one other housing part runs in a center region of the energy storage floor assembly in a main connection plane, and
the at least one longitudinal region of the gastight connection lying outside the main connection plane runs in a rear end region and/or a front end region of the energy storage floor assembly.

4. The energy storage floor assembly according to claim 3, wherein
the main connection plane extends at least substantially horizontally.

5. The energy storage floor assembly according to claim 3, wherein
the at least one longitudinal region of the gastight connection lying outside the main connection plane extends upwards, at least substantially in the vertical vehicle direction, in the rear end region and/or in the front end region of the energy storage floor assembly, starting from the main connection plane.

6. The energy storage floor assembly according to claim 1, wherein
the at least one longitudinal region of the gastight connection, which has an uneven course relative to the vertical vehicle direction, delimits a receiving space region of the storage housing, which receiving space region has a larger cross section in relation to a further receiving space region of the storage housing.

7. The energy storage floor assembly according to claim 2, wherein
the gastight connection of the other housing part, and of the vehicle floor, comprises a plurality of mechanical connection elements which are arranged outside of a seal running in the region of the gastight connection.

8. The energy storage floor assembly according to claim 2, wherein
the other housing part is configured as a floor element which is on the outside of the body shell.

9. The energy storage floor assembly according to claim 2, wherein
the vehicle floor has a one-part design or a two-part design, and the other housing part has a one-part design.

* * * * *